United States Patent
Alary et al.

(10) Patent No.: US 11,654,991 B2
(45) Date of Patent: May 23, 2023

(54) THEFT-DETERRENT SYSTEM FOR ELECTRIC BICYCLE USING THE MOTOR IN THE ABSENCE OF A BATTERY

(71) Applicant: EBIKELABS, Grenoble (FR)

(72) Inventors: Theophile Alary, Grenoble (FR); Maël Bosson, Grenoble (FR); Raphaël Marguet, Grenoble (FR)

(73) Assignee: EBIKELABS, Grenoble (FR)

( * ) Notice: Subject to any disclaimer, the term of this patent is extended or adjusted under 35 U.S.C. 154(b) by 166 days.

(21) Appl. No.: 17/251,691

(22) PCT Filed: Jun. 5, 2019

(86) PCT No.: PCT/FR2019/051344
§ 371 (c)(1),
(2) Date: Dec. 11, 2020

(87) PCT Pub. No.: WO2019/239034
PCT Pub. Date: Dec. 19, 2019

(65) Prior Publication Data
US 2021/0276648 A1    Sep. 9, 2021

(30) Foreign Application Priority Data

Jun. 13, 2018 (FR) ...................................... 1855158

(51) Int. Cl.
*B62H 5/08* (2006.01)
*B62J 43/10* (2020.01)
*H02P 3/22* (2006.01)
*B62J 43/23* (2020.01)

(52) U.S. Cl.
CPC ................ *B62H 5/08* (2013.01); *B62J 43/10* (2020.02); *B62J 43/23* (2020.02); *H02P 3/22* (2013.01)

(58) Field of Classification Search
USPC .......................................................... 318/379
See application file for complete search history.

(56) References Cited

FOREIGN PATENT DOCUMENTS

| CN | 103600789 A | * | 2/2014 |
| CN | 103600789 B | | 12/2015 |
| EP | 3492356 A1 | | 6/2019 |

(Continued)

OTHER PUBLICATIONS

WO 2005119897 A1 (Machine Translation) Power Conversion Device and Vehicle Equipped Therewith Inv: Oyobe Hichirosai Ishikawa Tetsuhiro Date Pub: Dec. 15, 2005 (Year: 2005).*

(Continued)

*Primary Examiner* — Jorge L Carrasquillo

(57) ABSTRACT

The invention relates to a method for deterring theft of a vehicle having a three-phase electric motor without a freewheel (10), comprising the steps of using the motor in a generator mode to power a motor control circuit (14) in an initial phase of rotating the motor through motion of the vehicle; and, when the power supply level of the control circuit reaches a first threshold (Vmin), connecting by the control circuit first and second phases (b, c) of the three-phase motor continuously to a first power supply line (Vss), whereby the first and second phases are short-circuited and cause an increased braking force of the motor. During this time, the third phase of the motor may be connected to continue to supply energy to the control circuit.

6 Claims, 1 Drawing Sheet

(56) References Cited

FOREIGN PATENT DOCUMENTS

| JP | 2002-264860 A | | 9/2002 | | |
| --- | --- | --- | --- | --- | --- |
| JP | 2002264860 A | * | 9/2002 | ……… | B60L 11/1801 |
| JP | 2006-273142 A | | 10/2006 | | |
| JP | 2006273142 A | * | 10/2006 | | |
| RU | 2656781 C1 | * | 6/2018 | ………… | B62K 15/00 |

OTHER PUBLICATIONS

CN 103259326 B (Machine Translation) A On-line With The Generator And Motor Three-phase Uninterruptible Emergency Uninterrupted Power Supply And Its Control Method Date Pub: Apr. 8, 2015 Inv: You, Jiang Meng, Fan-rong (Year: 2015).*

International Search Report and Written Opinion of the International Searching Authority in connection with International Application No. PCT/FR2019/051344 dated Aug. 2, 2019, 17 pages.

\* cited by examiner

THEFT-DETERRENT SYSTEM FOR ELECTRIC BICYCLE USING THE MOTOR IN THE ABSENCE OF A BATTERY

CROSS-REFERENCE TO RELATED APPLICATIONS

This application is a 371 National Stage of International Application No. PCT/FR2019/051344, filed Jun. 5, 2019, which claims priority to French Patent Application No. 1855158, filed Jun. 13, 2018, the disclosures of which are herein incorporated by reference in their entirety.

FIELD

The present invention relates to theft protection systems for electric vehicles, in particular electric bicycles. The invention applies more particularly to electric vehicles equipped with three-phase motors without a freewheel.

BACKGROUND

To protect an electric bicycle against theft, a traditional lock device may be used to attach the bicycle to a pole or at least block a wheel. This type of lock has a limited effectiveness depending on its structure, the location of the bike, and the length of time it is unused. Depending on the neighborhood and the apparent value of the bike, a thief will always find ways to break the lock.

In the case of an electric bicycle, the battery is usually removable, which allows the user to take it away, protecting the high value of the battery and significantly deterring theft of the bicycle.

Despite this, a thief can still break the lock and take the bike without the battery.

SUMMARY

To further deter the theft of an electric bicycle, a method for deterring theft of a vehicle having a three-phase electric motor without a freewheel, comprises the steps of using the motor in a generator mode to power a motor control circuit in an initial phase of rotating the motor through motion of the vehicle; and, when the power supply level of the control circuit reaches a first threshold, connecting by the control circuit first and second phases of the three-phase motor continuously to a first power supply line, whereby the first and second phases are short-circuited and cause an increased braking force of the motor.

The third phase of the motor may be connected to supply power to the control circuit while the first and second phases are short-circuited.

The method may comprise an initial step of removing a removable battery from the vehicle, whereby the control circuit is powered only by the rotation of the motor.

The method may further comprise the steps of storing energy produced by the motor in a capacitor of the control circuit; and, when the supply level of the control circuit reaches a second threshold higher than the first, connecting the third phase of the motor to the first supply line via the control circuit, whereby the three phases of the motor are short-circuited and the rotation of the motor no longer supplies power to the control circuit.

The method may comprise, when the power supply level of the control circuit decreases to the first threshold, a step of disconnecting the third phase of the motor from the first power supply line.

Also, a theft deterrent device for an electric vehicle is generally provided, comprising a three-phase motor without a freewheel; a removable battery; a power stage configured to individually connect the three phases of the motor to two supply lines; and a control circuit configured to be powered by the rotation of the motor in the absence of a battery and to, as soon as its power level is sufficient, control the power stage to continuously connect two phases of the motor to a first of the supply lines.

The control circuit may further be configured to connect the third phase of the motor to continue to supply power to the control circuit.

The control circuit may comprise a capacitor connected to store energy produced by the motor, and be further configured to control the power stage to connect the third phase of the motor to the first supply line when the power level produced by the motor exceeds a threshold.

The control circuit may be further configured to disconnect the third phase of the motor from the first power supply line when the supply level available in the capacitor decreases to a minimum supply level.

BRIEF DESCRIPTION OF DRAWINGS

Embodiments will be exposed in the following description, in relation with the attached figures among which.

DESCRIPTION OF EMBODIMENTS

In the following disclosure, an electric vehicle theft deterrent system is proposed that uses the energy generated by the motor when the motor is rotated by motion of the vehicle. This allows the system to operate without a battery, particularly in the case of electric bicycles with removable batteries. Preferably, the motor is of three-phase type without a freewheel, i.e. the motor is permanently engaged with a wheel.

Figure 1:
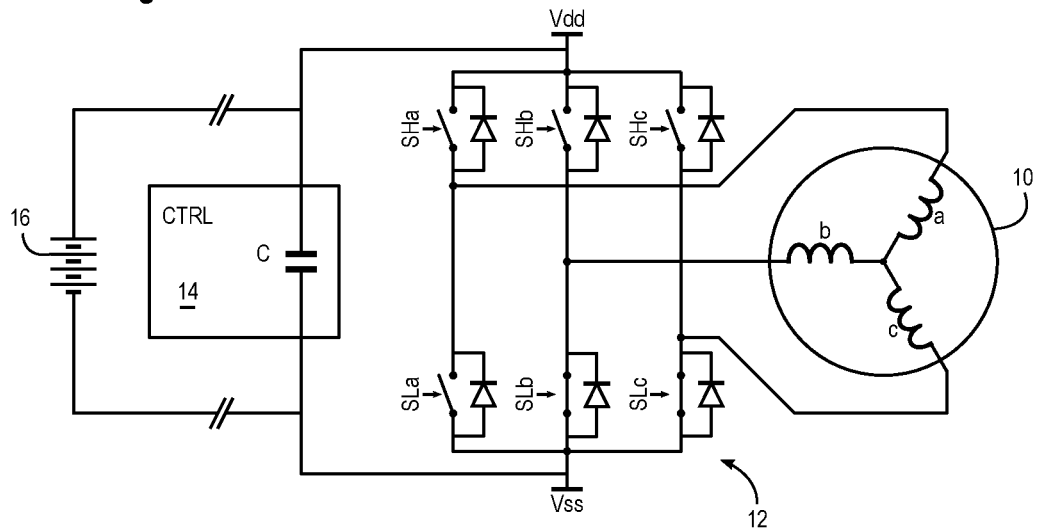
FIG. 1 schematically represents a three-phase electric vehicle motor and part of its control circuit, in a first configuration according to the invention to deter theft.

FIG. 1 is a simplified electrical diagram of a three-phase motor 10 of an electric bicycle in combination with a control device, of which only elements that are useful to understand the described embodiments have been shown. The windings or phases a, b, c of the motor may be arranged in a star configuration as shown. The control device may be conventional, e.g. so-called field-oriented or FOC.

The control device includes a power stage 12, usually electronic switches forming an "H-bridge". Each phase of the motor is controlled by a pair of switches SH, SL, the first switch connecting the phase to a high supply line Vdd, and the second connecting the phase to a low supply line Vss. The switches associated with a phase are suffixed with the name of the phase. In addition, each switch is connected with a freewheeling diode. These diodes ensure that induced currents are discharged to a supply line even when the switches are open.

A control circuit 14 is configured to control the motor via power stage 12 based on sensor measurements and setpoints. These elements are well known in the Art and will not be described in more detail.

A rechargeable battery 16 normally supplies the various elements of the control device via the Vdd and Vss lines. In the case of an electric bicycle, battery 16 is usually removable. As previously mentioned, the user will tend to remove the battery when the bike is parked in a public area. In this case, nothing will power the control device elements and the switches SH and SL will all remain open.

Thus, when the motor is set into rotation, for example in the event of theft, it acts in generator mode and produces alternating voltages at the terminals of its phases. If the rotation is fast enough, these voltages are high enough to be rectified by the diodes of the power stage and thus supply the control circuit 14.

A conventional control circuit, even if it is sufficiently powered under these conditions, does not take any action because it does not receive any commands.

According to an embodiment, the control circuit is configured to be in an anti-theft mode under these conditions. This mode may be enabled systematically as soon as the battery is removed, or programmed on demand by the user when the battery is still in place, for example in a non-volatile memory of the control circuit, using a bicycle control console or wirelessly via a dedicated application on a smartphone.

In this anti-theft mode, as soon as the control circuit is sufficiently powered, it controls the power stage to continuously short-circuit two of the three motor phases. For this purpose, any two phases are connected to one of the lines Vdd and Vss by two switches SH or SL. As shown in the example, phases b and c are connected to the line Vss by continuously closing the switches SLb and SLc.

Thus, the currents induced in phases b and c by a motor rotation are maximized and produce a strong electromagnetic braking effect, an effect that increases with the motor speed. While two of the phases are thus used for braking, the third phase, which remains open, is used to maintain the power supply of the control circuit to ensure continuity of braking, i.e. to keep the switches SLb and SLc closed.

The braking effect increases with speed, so that a thief who wants to escape on the bike, usually as fast as possible, quickly ends up running out of breath and giving up the attempt, leaving the bike not far from the original parking place. If the bike is equipped with a GPS tracker, it can be powered at the same time as the control circuit, and thus indicate the location where the thief left the bike.

If the thief is able to maintain sufficient speed, the energy produced by the open phase (a) may be in excess of that required to power the control circuit. This energy may be stored in a high-value capacitor C, or a super-capacitor.

Figure 2:
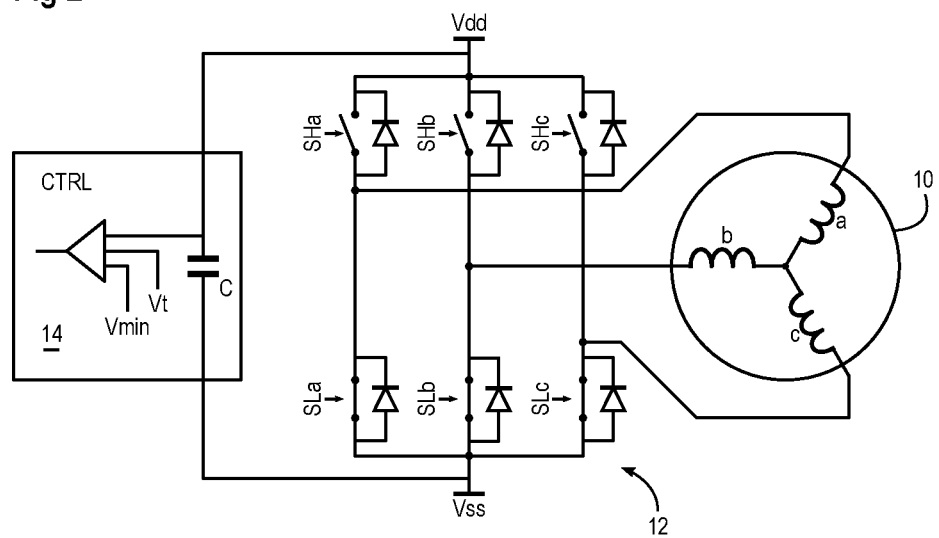
FIG. 2 schematically represents the structure of FIG. 1, in a second more effective configuration than the first.

FIG. 2 illustrates a configuration that increases the braking force by taking advantage of the energy stored in the capacitor C.

Control circuit 14 is configured to measure the charge level of capacitor C, for example by comparing the charge voltage to a threshold value Vt. When the threshold Vt is exceeded, the control circuit short-circuits all three phases of the motor, for example by closing all switches SL, as shown. Then, all three motor phases contribute to braking, increasing the braking force by 50% compared to the configuration of FIG. 1.

The control circuit is then powered only by the charge in the capacitor C. When the charge voltage of capacitor C drops to the minimum limit Vmin of the control circuit supply, the control circuit releases one of the motor phases by opening the corresponding switch to maintain the supply level of the control circuit. The device then returns to the configuration shown in FIG. 1.

If, in the configuration of FIG. 1, the energy produced by the single open phase of the motor is not sufficient to power the control circuit, the control circuit will inevitably stop working. As a result, all switches SH and SL open naturally, thus freeing the three motor phases. The capacitor C then being charged by three phases instead of one, the charge level increases rapidly to reach the minimum supply level of the control circuit, which then returns to the configuration shown in FIG. 1.

Under certain conditions, the control circuit may be configured to switch directly to the configuration of FIG. 2 when sufficient power is supplied. Then, instead of alternating between a medium braking phase but allowing the control circuit to be powered (FIG. 1) and a strong braking phase (FIG. 2), the system alternates between a no-braking phase but rapidly recharging the capacitor C, and a strong braking phase until the capacitor is discharged. The latter mode may produce a higher average braking force than the first mode when the control circuit consumes very little power, i.e. when the recharging phases last only a short time compared to the braking phases.

The theft deterrent system described above is particularly well suited for motors without a freewheel function. Indeed, since the motor is always in engagement with a wheel, the system also works when the bike is pushed.

The invention claimed is:

1. A method for deterring theft of a vehicle having a three-phase electric motor without a freewheel function, the method comprising the following steps in a vehicle anti-theft mode:
   removing a removable battery from the vehicle;
   using the motor in a generator mode to supply power to a control circuit in an initial phase of motor rotation caused by motion of the vehicle;
   triggering braking when a power supply level of the control circuit reaches a first threshold, by connecting first and second phases of the three-phase motor continuously to a first supply line; and
   using the third phase of the motor to supply power to the control circuit while the first and second phases are connected to the first supply line.

2. The method according to claim 1, further comprising the following steps:
   storing energy produced by the motor in a capacitor of the control circuit; and
   when the supply level of the control circuit reaches a second threshold higher than the first, connecting the third phase of the motor to the first supply line via the control circuit, whereby the rotation of the motor no longer supplies power to the control circuit.

3. The method according to claim 2, comprising, when the power supply level of the control circuit decreases to the first threshold, a step of disconnecting the third phase of the motor from the first supply line.

4. A theft deterrent device for an electric vehicle, comprising:
   a three-phase motor without a freewheel;
   a control circuit;
   a power stage configured, in response to the control circuit, to selectively connect the three phases of the motor to two supply lines;
   a removable battery; and
   wherein the control circuit is configured to be powered by rotation of the motor in the absence of the removable battery and to, as soon as its power level is sufficient, control the power stage to continuously connect two phases of the motor to a first of the supply lines, while connecting the third phase of the motor to continue to supply power to the control circuit.

5. The device according to claim 4, wherein the control circuit comprises a capacitor connected to store energy produced by the motor, and is further configured to control the power stage to connect the third phase of the motor to the first supply line when the power level produced by the motor exceeds a threshold.

6. The device according to claim 5, wherein the control circuit is further configured to disconnect the third phase of the motor from the first supply line when the supply level available in the capacitor decreases to a minimum supply level.

* * * * *